(12) United States Patent
Sehgal et al.

(10) Patent No.: US 11,768,704 B2
(45) Date of Patent: Sep. 26, 2023

(54) INCREASE ASSIGNMENT EFFECTIVENESS OF KUBERNETES PODS BY REDUCING REPETITIVE POD MIS-SCHEDULING

(71) Applicant: Red Hat, Inc., Raleigh, NC (US)

(72) Inventors: Swat Sehgal, Cork (IE); Marcel Apfelbaum, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 224 days.

(21) Appl. No.: 17/243,450

(22) Filed: Apr. 28, 2021

(65) Prior Publication Data
US 2022/0350656 A1   Nov. 3, 2022

(51) Int. Cl.
G06F 9/46   (2006.01)
G06F 9/48   (2006.01)
G06F 9/50   (2006.01)

(52) U.S. Cl.
CPC .......... G06F 9/4887 (2013.01); G06F 9/5083 (2013.01)

(58) Field of Classification Search
CPC .............................. G06F 9/4887; G06F 9/5083
See application file for complete search history.

(56) References Cited

U.S. PATENT DOCUMENTS

| 2016/0057076 | A1* | 2/2016 | Zlati | H04L 67/1001 |
| | | | | 709/201 |
| 2019/0064912 | A1* | 2/2019 | Tagawa | G06F 1/3287 |
| 2020/0336384 | A1 | 10/2020 | Jha et al. | |
| 2021/0019196 | A1 | 1/2021 | Geffin et al. | |

FOREIGN PATENT DOCUMENTS

| CN | 111625337 A | 9/2020 |
| CN | 111737003 A | 10/2020 |
| CN | 112214288 A | 1/2021 |
| CN | 112231049 A | 1/2021 |

OTHER PUBLICATIONS

Bhatnagar, Yash. "Kubernetes Cost Optimization: How to Rebalance Fragmented Kubernetes Clusters to Reduce Cloud Costs," https://www.cloudhealthtech.com/blog/rebalance-fragmented-kubernetes-clusters-reduce-cloud-costs, Dec. 15, 2020 (8 pages).

* cited by examiner

*Primary Examiner* — Gregory A Kessler
(74) *Attorney, Agent, or Firm* — Womble Bond Dickinson (US) LLP

(57) ABSTRACT

Systems and methods for intelligently scheduling a pod in a cluster of worker nodes are described. A scheduling service may account for previous scheduling attempts by considering the time and node (scheduling data) on which a preceding attempt to schedule a node were made, and factoring this information into the scheduling decision. Upon making a determination of a node on which to attempt to schedule the pod, the scheduling data may be updated with the time and node ID of the determined node and the pod may be scheduled on the determined node. In response to determining that the pod has been evicted from the determined node, the above process may continue iteratively until the pod has been successfully scheduled.

20 Claims, 7 Drawing Sheets

INCREASE ASSIGNMENT EFFECTIVENESS OF KUBERNETES PODS BY REDUCING REPETITIVE POD MIS-SCHEDULING

TECHNICAL FIELD

Aspects of the present disclosure relate to container-orchestration systems, and more particularly, to intelligently assigning one or more pods in a container-orchestration system.

BACKGROUND

A container orchestration engine (such as the Redhat™ OpenShift™ module) may be a platform for developing and running containerized applications and may allow applications and the data centers that support them to expand from just a few machines and applications to thousands of machines that serve millions of clients. Container orchestration engines comprise a control plane and a cluster of worker nodes on which pods may be scheduled. A pod is may refer to the most basic (smallest) compute unit that can be defined, deployed, and managed by the control plane (e.g., one or more containers deployed together on a single host). The control plane may include a scheduler that is responsible for determining placement of new pods onto nodes within the cluster. The scheduler may read data from a pod and attempt to find a node that is a good fit based on configured policies and predicates.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
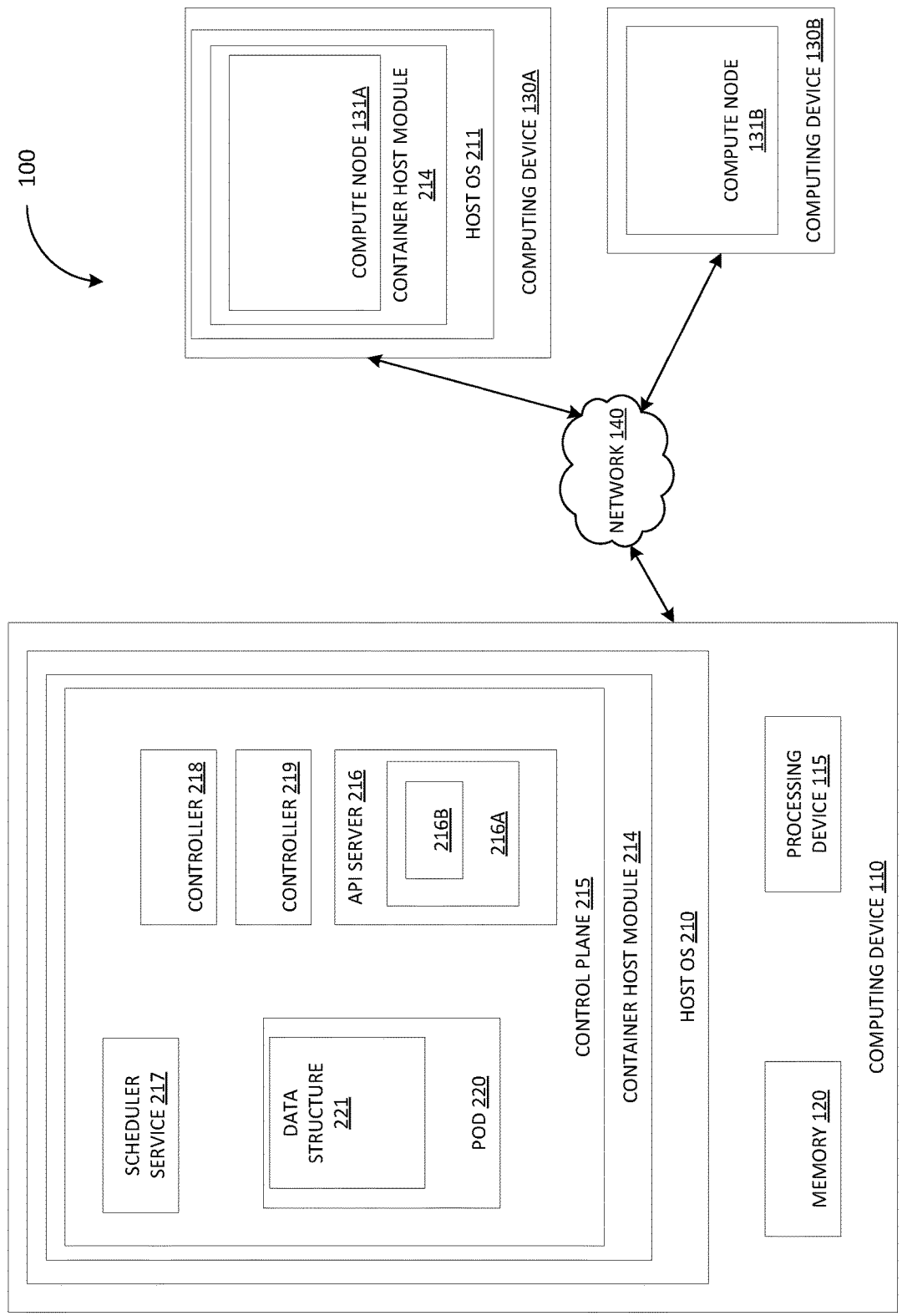
FIG. 1A is a block diagram that illustrates an example system, in accordance with some embodiments of the present disclosure.

A scheduler's attempts to assign a pod to a node may be unsuccessful even when the scheduler operates in compliance with the configured predicates. This may occur for example, when the node evicts the pod, which in turn prevents the workload(s) associated with the pod from being supported. Eviction can occur, at least in part, because the resources of the node (e.g., compute and memory resources) are already in use, outdated, or insufficient to support the workload(s) associated with the pod. Because the scheduler lacks visibility into at least some of the container-orchestration system (e.g., information about failed or successful attempts to assign pod(s), etc.), the scheduler may be unable to resolve erroneously assigning the pod to the unsuitable host system despite compliance with predicate(s).

Additionally, because the scheduler is stateless, it may continue attempting to assign the pod to the same unsuitable node, which will continue to evict the pod. This undesirable scenario may result in suboptimal resource utilization and/or operational efficiency of the scheduler, the unsuitable node, and other components of the container-orchestration system. The above scenario is attributable, at least in part, to the scheduler's lack of visibility into some or all of the container-orchestration system. This lack of visibility includes a dearth of information about one or more failed or successful attempts to schedule the pod to a node. The information about the attempt(s) may include information about one or more evictions that occurred in the container-orchestration system, information about the host system(s), the pod(s), or a combination thereof.

The present disclosure addresses the above-noted and other deficiencies by using a processing device to schedule a pod on a first node of a plurality of nodes and updating scheduling data of the pod with a node identifier (ID) of the first node and a time stamp indicating a time at which the pod was scheduled on the first node. In response to receiving an indication that the pod has been evicted from the first node, the processing device may further determine a second node of the plurality of nodes on which to schedule the pod based at least in part on the scheduling data of the pod. The processing may schedule the pod on the second node of the plurality of nodes and may update the scheduling data of the pod with a node ID of the second node and a second time stamp indicating a time at which the pod was scheduled on the second node. In response to receiving an indication that the pod has been evicted from the second node, the processing device may iteratively, until the pod is successfully scheduled on one of the plurality of nodes: determine a subsequent node of the plurality of nodes on which to schedule the pod based at least in part on the scheduling data of the pod; update the scheduling data of the pod with a node ID of the subsequent node and a subsequent time stamp indicating a time at which the pod was scheduled on the subsequent node; and schedule the pod on the subsequent node.

FIG. 1 is a block diagram that illustrates an example system 100. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 130. Each computing device may include hardware such as processing device 115 (e.g., processors, central processing units (CPUs), memory 120 (e.g., random access memory 120 (e.g., RAM), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110.

Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 210 and host OS 211 of computing device 110 and 130 respectively, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 130 may each implement a compute node (e.g., as part of the container orchestration engine).

In some embodiments, a container orchestration engine 214 (referred to herein as container host 214), such as the Redhat™ OpenShift™ module, may execute on the host OS 210 of computing device 110 and the host OS 211 of computing device 130, as discussed in further detail herein. The container host module 214 may be a platform for developing and running containerized applications and may allow applications and the data centers that support them to expand from just a few machines and applications to thousands of machines that serve millions of clients. Container host 214 may provide an image-based deployment module for creating containers and may store one or more image files for creating container instances. Many application instances can be running in containers on a single host without visibility into each other's processes, files, network, and so on. In some embodiments, each container may provide a single function (often called a "micro-service") or component of an application, such as a web server or a database, though containers can be used for arbitrary workloads. In this way, the container host 214 provides a function-based architecture of smaller, decoupled units that work together.

Container host 214 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 214 or a registry server. In some embodiments, the image file may include one or more base layers. An image file may be shared by multiple containers. When the container host 214 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

While the container image is the basic unit containers may be deployed from, the basic units that the container host 214 may work with are called pods. A pod may refer to one or more containers deployed together on a single host, and the smallest compute unit that can be defined, deployed, and managed. Each pod is allocated its own internal IP address, and therefore may own its entire port space. A user (e.g., via the container host module 214) may define the entry point script of a pod to instruct the pod to configure itself as a unique simulated compute node with its own IP addresses and simulated network stacks and communicate with the internal API of the control plane. Containers within pods may share their local storage and networking. In some embodiments, pods have a lifecycle in which they are defined, they are assigned to run on a node, and they run until their container(s) exit or they are removed based on their policy and exit code. Although a pod may contain one or more than one container, the pod is the single unit that a user may deploy, scale, and manage.

By their nature, containerized applications are separated from the operating systems where they run and, by extension, their users. The control plane 215 may expose applications to internal and external networks by defining network policies that control communication with containerized applications (e.g., incoming HTTP or HTTPS requests for services inside the cluster 131).

A typical deployment of the container host 214 may include a control plane 215 and a cluster of worker nodes 131, including worker nodes 131A and 131B (also referred to as compute machines). The worker nodes 131 may run the aspects of the container host 214 that are needed to launch and manage containers, pods, and other objects. For example, a worker node may be a physical server that provides the processing capabilities required for running containers in the environment. A worker node may also be implemented as a virtual server, logical container, or GPU, for example.

The control plane 215 may include REST APIs (not shown) (e.g., Kubernetes APIs) which expose objects, as well as controllers 218 and 219 which read those APIs, apply changes to objects, and report status and/or write back to objects. Objects may be persistent entities in the container host 214, which are used to represent the state of the cluster 131 (e.g., deployments, replicasets, and pods). The control plane 215 may run an API server 216 (e.g., Kubernetes API server) that validates and configures the data for objects such as e.g., pods, services, and controllers as well as provides a focal point for the cluster 131"s persistent master state. The control plane 215 may include a master state store (not shown) that stores the persistent master state of the cluster 131 (e.g., an etcd store). The control plane 215 may also include a controller-manager service (not shown) such as e.g., Kubernetes-controller-manager that includes a set of informers (not shown) that watch the etcd store for changes to objects such as replication, namespace, and "serviceaccount" controller objects, and then uses the API server 216 to enforce the specified state.

The control plane 215 may also run a scheduler service 217 that is responsible for determining placement of (i.e., scheduling) new pods onto nodes within the cluster 131. The scheduler service 217 reads data from the pod and attempts to find a node 131 that is a good fit based on configured policies. Once a suitable node 131 is found, the scheduler service 217 creates a binding for the pod that ties the pod to the particular node 131. The scheduler service 217 may consider the resource needs of a pod, such as CPU or memory, along with the health of the cluster 131, when making scheduling decisions about the pod to an appropriate node 131.

The API server 216 may receive a pod specification (e.g., specification 216A) defining a pod 220. The specification 216A may be user-defined via the container host module 214 for example, and may include information defining the lifecycle of the pod 220. The API server 216 may generate the pod 220 based on the specification 216A, which may define a manner of generating the pod 220. More specifically, the specification 216A may instruct the API server 216 to generate the pod 220 with a data structure 221 having one or more fields within which to store a set of scheduling data 222 of the pod 220. The container host 214 may provide a default scheduling policy having several default predicates and the specification 216A may also define one or more custom predicates, where each predicate is a rule that filters out unqualified nodes 131 during a scheduling process for the pod 220. Multiple predicates can be combined to provide additional filtering of nodes 131. The one or more custom predicates provided by the specification 216A may define a particular set of rules 216B for use in scheduling the pod 220 based on the set of scheduling data 222, as discussed in further detail herein.

Figure 2:
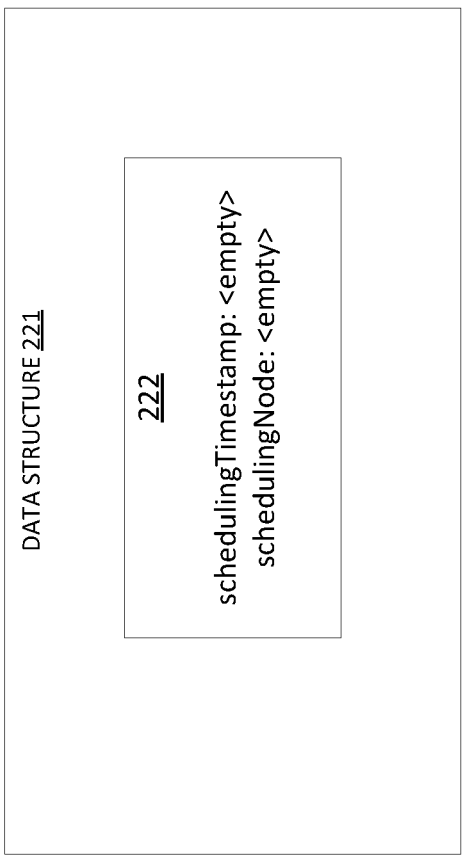
FIG. 2 is a block diagram that illustrates scheduling data within a pod, in accordance with some embodiments of the present disclosure.

In accordance with the set of rules 216B, the scheduler service 217 may analyze the data structure 221 to identify the set of scheduling data 222 when making an attempt to assign the pod 220 to one of the nodes 131. More specifically, the scheduler service 217 analyzes the data structure 221 to identify the set of scheduling data 222 of the pod 220 and attempts to schedule the pod 220 based on the set of scheduling data 222 and the set of rules 216B as discussed in further detail herein. The set of scheduling data 222 may include a time stamp associated with a preceding attempt to schedule the pod 220 and an identity of a node 131 that the scheduler service 217 attempted to assign the pod 220 to during the preceding attempt to schedule the pod 220. FIG. 2 illustrates the data structure 221 including the fields where the set of scheduling data 222 of the pod 220 is stored. As shown in FIG. 2, the data structure 221 includes a time stamp field which is currently empty ("schedulingTimestamp: <empty>") where a time stamp associated with a preceding attempt to schedule the pod 220 (indicating a time at which the previous attempt to schedule the pod 220 was made) may be recorded. The data structure 221 may further include a node identity field which is currently empty ("schedulingNode: <empty>") where an identity of a node 131 that the scheduler service 217 attempted to assign the pod 220 to during the preceding attempt to schedule the pod 220 may be recorded. Although embodiments of the present disclosure are described with respect to scheduling a single pod 220 for ease of description and illustration, it should be noted that any appropriate number of pods may be scheduled using the techniques described herein.

Referring back to FIG. 1A, when the scheduler service 217 makes a current attempt to schedule the pod 220, it may analyze the data structure 221 to identify the set of scheduling data 222 (currently associated with a preceding attempt) and attempt to schedule the pod 220 based in part on the set of scheduling data 222 as discussed in further detail herein. The scheduler service 217 may identify the set of scheduling data 222 of the pod 220 in real-time or near real-time prior to or at the time of each attempt by the scheduler service 217 to schedule the pod 220. The scheduler service 217 may also update the set of scheduling data 222 with the corresponding timestamp and node identity of the current scheduling attempt as discussed in further detail herein. It is to be appreciated that there may have been no preceding attempts by the scheduler service 217 to schedule the pod 220 (e.g., when the pod 220 is first created). In this situation, the data structure 221 may have null values in the time stamp and node identity fields (e.g., these fields of the data structure 221 may be empty as shown in FIG. 2). If there have been no previous attempts to schedule the pod 220, the scheduler service 217 may perform an initial attempt to schedule the pod 220 based on the default security policy (e.g., using the default predicates) and the resource requirements of the pod 220. More specifically, the scheduler service 217 may determine a node 131 on which to schedule the pod 220 based on the default security policy (e.g., using the default predicates) and the resource requirements of the pod 220. The scheduler service 217 may update the set of scheduling data 222 with the corresponding timestamp and node identity of the determined node 131 and then attempt to schedule the pod 220 on the determined node 131.

After the initial attempt to schedule the pod 220, for each subsequent attempt to schedule the pod 220, the scheduler service 217 analyzes the data structure 221 to identify the set of scheduling data 222 of the pod 220 and may attempt to schedule the pod 220 on one of the nodes 131 based in part on the set of scheduling data 222 and the set of rules 216B. More specifically, the set of rules 216B may specify a threshold amount of time after a preceding attempt within which a subsequent attempt to schedule the pod 220 must be made. The set of rules 216B may instruct the scheduler service 217 to determine whether the threshold amount of time has elapsed since the timestamp associated with the immediately preceding attempt to schedule the pod 220. If the amount of time that has elapsed is greater than the threshold amount of time, the scheduler service 217 may not make a subsequent scheduling attempt based on the set of scheduling data 222 and may instead attempt to schedule the pod 220 based on the default security policy (e.g., using the default predicates) and the resource requirements of the pod 220. This is because expiration of the threshold amount of time may indicate that the amount of available resources on one or more nodes 131 has changed such that previously unsuitable nodes may have become more suitable (e.g., have had additional resources freed up etc.). The set of rules 216B may further specify that if the amount of time that has elapsed since the preceding attempt is less than or equal to the threshold amount of time, the scheduler service 217 may not attempt to schedule the pod on a node 131 that was the subject of the preceding attempt to schedule the pod 220. Stated differently, the scheduler service 217 may attempt to schedule the pod 220 based on the default security policy (e.g., using the default predicates) and the resource requirements of the pod 220 but may exclude the node 131 that was the subject of the preceding attempt to schedule the pod 220 from consideration.

Upon determining the node 131 on which it will attempt to schedule the pod 220, the scheduler service 217 may update the scheduling data 222 with the corresponding timestamp and node identity of the determined node 131 and attempt to schedule the pod 220 on the determined node 131. The above described process may be performed iteratively until a predetermined event occurs, such a successful attempt to schedule the pod 220 on one of the nodes 131. A successful attempt to assign the pod 220 to the determined node 131 may correspond to the determined node 131 successfully binding the pod 220 to the determined node 131.

Figure 3:
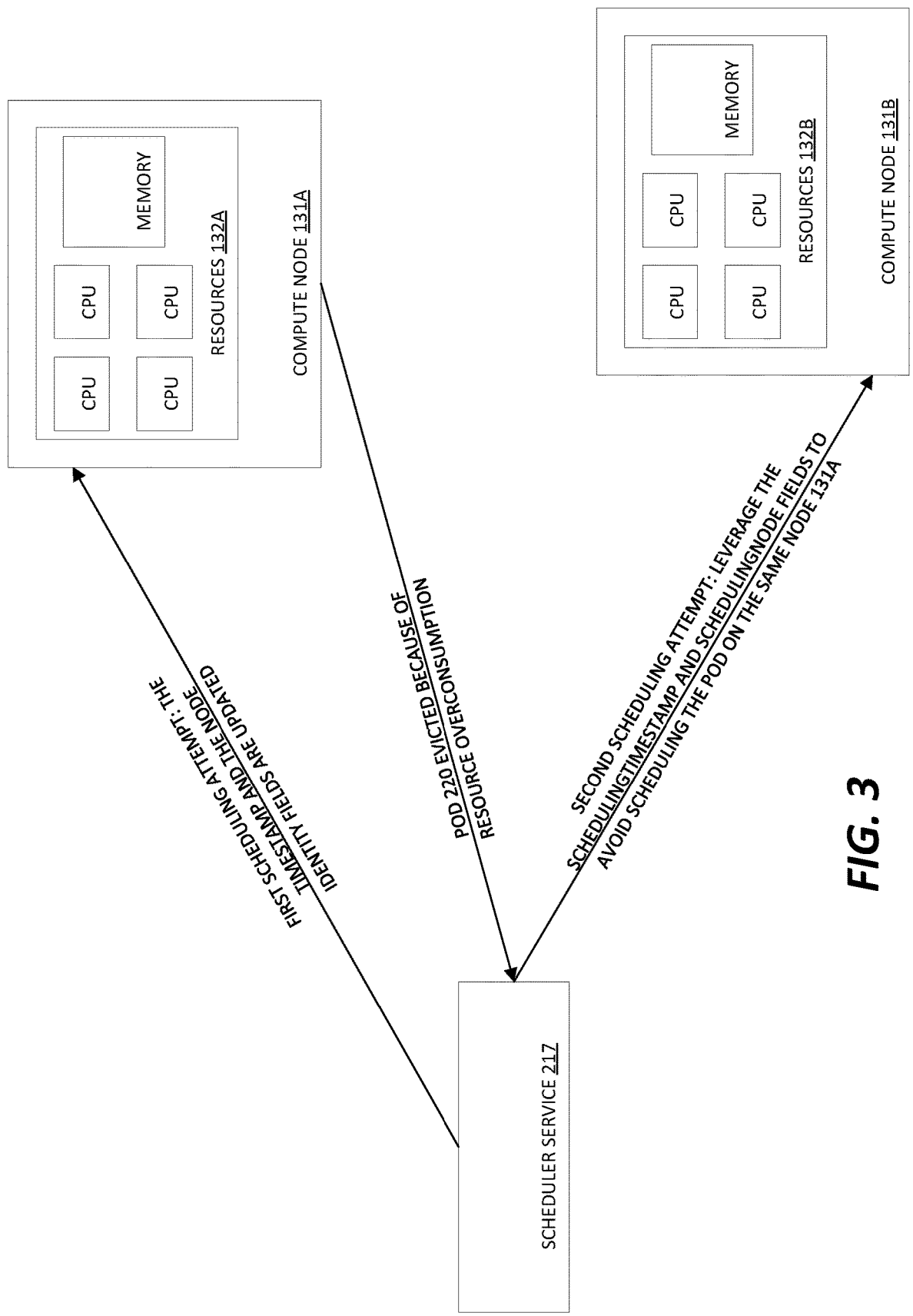
FIG. 3 is a block diagram that illustrates an intelligent process for scheduling a pod, in accordance with some embodiments of the present disclosure.

FIG. 3 illustrates an example of the scheduler service 217 iteratively attempting to schedule the pod 220 on a node 131 in accordance with some embodiments of the present disclosure. In the example of FIG. 3, the pod 220 may have been recently generated by the API server 216 as discussed hereinabove and has not yet been the subject of any attempts to schedule on the nodes 131. Because the scheduler service 217 is performing a first attempt to schedule the pod 220, the data structure 221 may not contain any information regarding the set of scheduling data 222. Thus, the scheduler service 217 may initially attempt to schedule the pod 220 based on the default security policy (e.g., using the default predicates) and the resource requirements with all of the nodes 131 as possible destinations.

As shown in FIG. 3, the scheduler service 217 makes a first scheduling attempt and attempts to schedule the pod 220 on node 131A. The first scheduling attempt may be based on the default security policy (e.g., using the default predicates) as there is no scheduling data yet. Upon determining that node 131A is where it will make the first attempt to schedule pod 220, the scheduler service 217 may update the fields of the data structure 221 with the timestamp of the first scheduling attempt and an identity of node 131A. The scheduler service 217 performs the first iteration of the attempt to assign by communicating information regarding the pod 220 to the node 131A via the API server 216. Following the node 131A''s receipt of the information from the scheduler service 217, the node 131A may determine whether the pod 220 can be supported by the resources 132A (e.g., processing and memory resources) of the node 131A. In one example, the node 131A makes this determination in view of an availability and/or a suitability of the resources 132A (e.g., processor availability and memory availability) of the node 131A for running the pod 220. In some embodiments, the node 131A may include a component called an eviction manager (not shown) that monitors/tracks the quality of service (QoS) of the pods currently deployed on the node 131A and evicts pods as necessary. In the example of FIG. 3, the node 131A determines that the resources 132A associated with the node 131A are unavailable or unsuitable for running the pod 220. This may be because e.g., the pod 220 may not be a guaranteed pod (i.e., is part of a QoS class that does not have resource consumption guarantees), and thus may require more resources than can be allocated to a non-guaranteed pod, leading to its eviction.

In response to the pod 220''s eviction from node 131A, the scheduler service 217 may make a second scheduling attempt. For the second scheduling attempt, the scheduler service 217 may read the set of scheduling data 222 from the data structure 221 of the pod 220, and compare the timestamp of the first scheduling attempt to a current time to determine how much time has elapsed since the first scheduling attempt. If the amount of time that has elapsed is less than or equal to the threshold amount of time, then the scheduler service 217 may determine the identity of the node associated with the previous scheduling attempt as node 131A, and may add node 131A to a list of nodes that pod 220 cannot be scheduled on. Scheduler service 217 may then determine a second node 131B on which a second attempt to schedule pod 220 will be made, and may update the fields of the data structure 221 with the timestamp and node identity (node 131B) associated with the second attempt.

If the scheduler service 217 determines that the amount of time that has elapsed since the first scheduling attempt is greater than the threshold amount of time, then the scheduler service 217 may ignore the set of scheduling data 222 and may perform a second attempt to schedule the pod 220 based on the default security policy (e.g., using the default predicates). This is because expiration of the threshold amount of time may indicate that the amount of available resources on one or more nodes 131 has changed such that previously unsuitable nodes may have become suitable (e.g., have had additional resources freed up etc.). The scheduler service 217 may update the fields of the data structure 221 with the timestamp and node identity associated with the second attempt. If the second attempt to schedule the pod 220 is not successful, then the scheduler service 217 may continue iteratively attempting to schedule the pod 220 as discussed above. If the second attempt to schedule the pod 220 is successful, then the scheduler service 217 may proceed to schedule another pod or perform any other appropriate tasks. The pod 220 may run through its lifecycle and shut down in accordance with the specification 216A.

Figure 4:
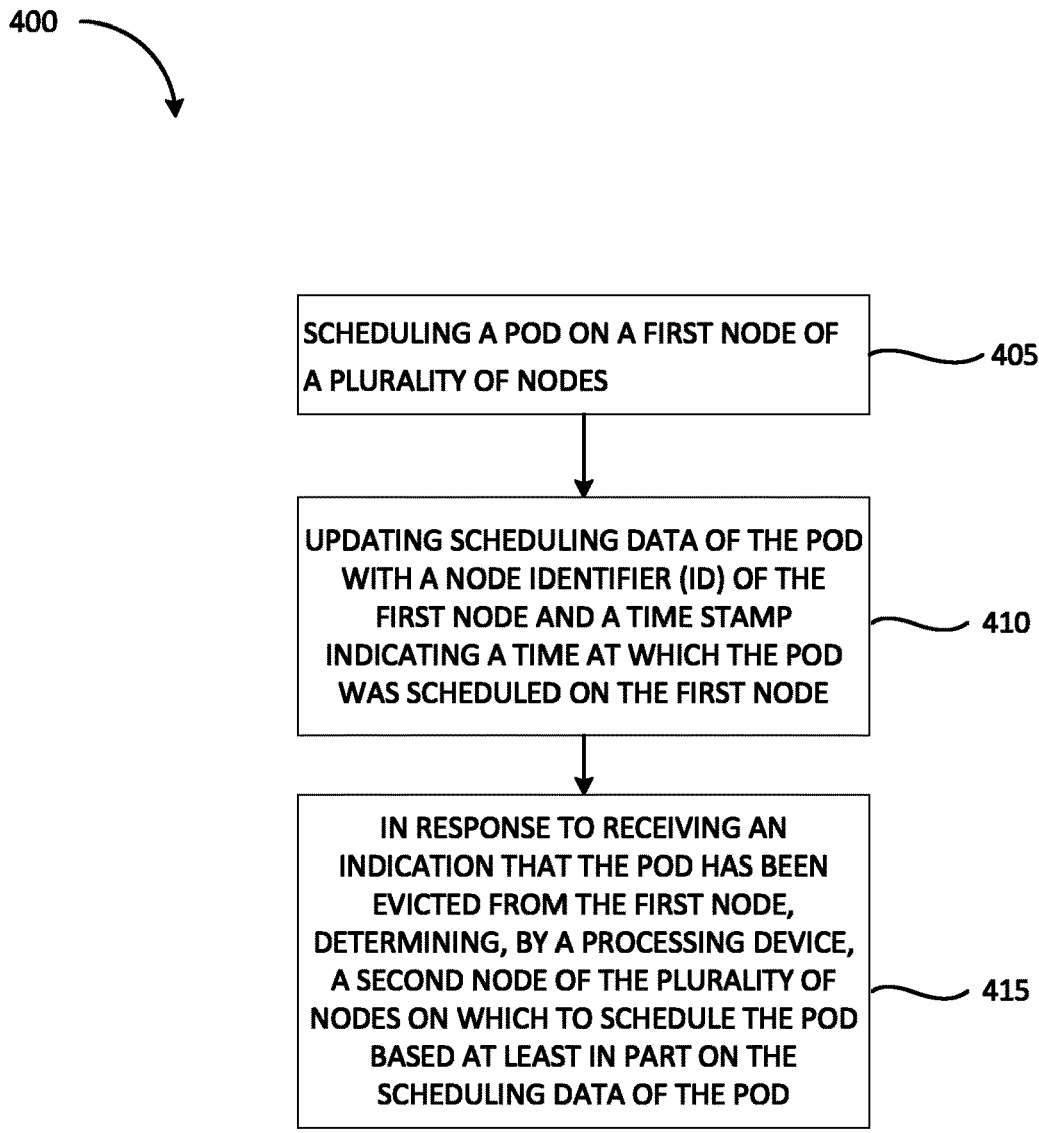
FIG. 4 is a flow diagram of a method for intelligently scheduling a pod, in accordance with some embodiments of the present disclosure.

FIG. 4 is a flow diagram of a method 400 for intelligently scheduling pods, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. in some embodiments, the method 400 may be performed by a computing device (e.g., computing device 110 illustrated in FIGS. 1A and 1B).

Figure 1B:
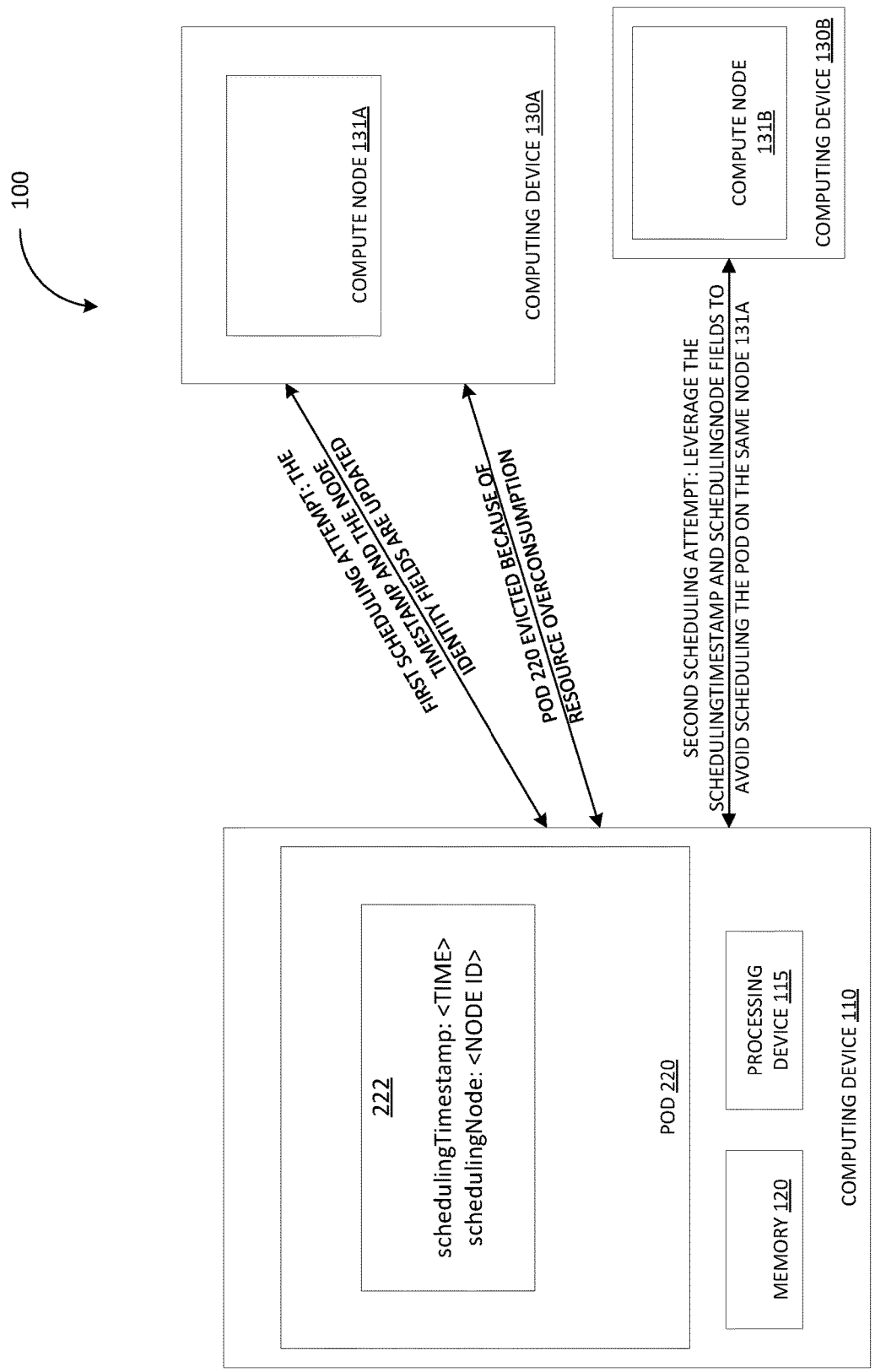
FIG. 1B is a block diagram that illustrates an example system, in accordance with some embodiments of the present disclosure.

Referring also to FIG. 1A, at block 405, the scheduler service 217 may schedule the pod on a first node 131. It is to be appreciated that there may have been no preceding attempts by the scheduler service 217 to schedule the pod 220 (e.g., when the pod 220 is first created). In this situation, the data structure 221 may have null values in the time stamp and node identity fields (e.g., these fields of the data structure 221 may be empty as shown in FIG. 2). If there have been no previous attempts to schedule the pod 220, the scheduler service 217 may perform an initial attempt to schedule the pod 220 based on the default security policy (e.g., using the default predicates) and the resource requirements of the pod 220. More specifically, the scheduler service 217 may determine a first node 131 on which to schedule the pod 220 based at least in part on the default security policy (e.g., using the default predicates) and the resource requirements of the pod 220. At block 410, the scheduler service 217 may update the set of scheduling data 222 with the corresponding timestamp and node identity of the determined node 131 and then attempt to schedule the pod 220 on the determined node 131.

After the initial attempt to schedule the pod 220, at block 415, for each subsequent attempt to schedule the pod 220, the scheduler service 217 analyzes the data structure 221 to identify the set of scheduling data 222 of the pod 220 and may attempt to schedule the pod 220 on one of the nodes 131 based in part on the set of scheduling data 222 and the set of rules 216B. More specifically, the set of rules 216B may specify a threshold amount of time after a preceding attempt within which a subsequent attempt to schedule the pod 220 must be made.

Figure 5:
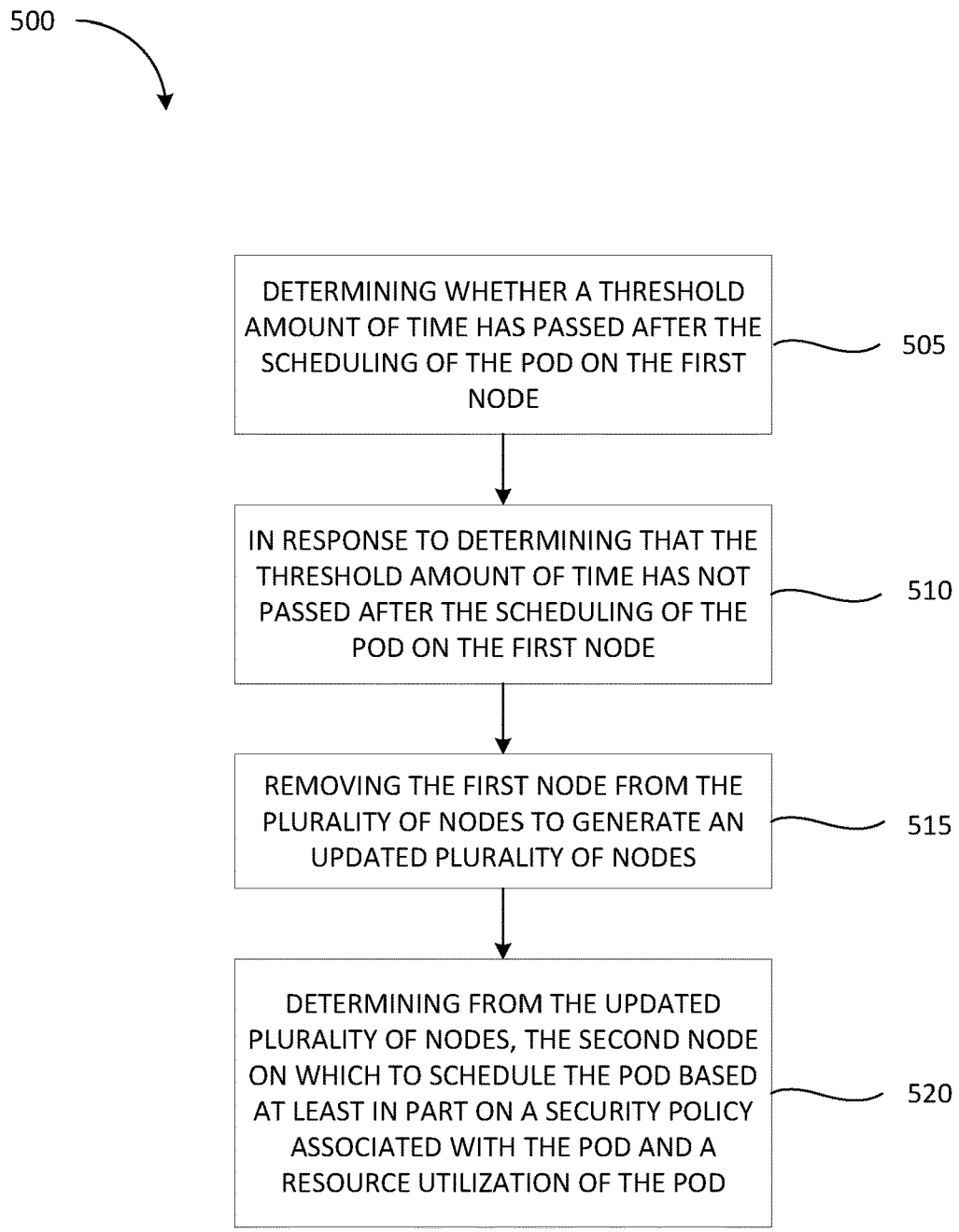
FIG. 5 is a flow diagram of a method for determining a subsequent node on which a pod may be scheduled, in accordance with some embodiments of the present disclosure.

FIG. 5 is a flow diagram of a method 500 for determining a node on which to schedule a pod, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. in some embodiments, the method 500 may be performed by a computing device (e.g., computing device 110 illustrated in FIGS. 1A and 1B).

Referring also to FIG. 1A, at block 505, the set of rules 216B may instruct the scheduler service 217 to determine whether the threshold amount of time has elapsed since the timestamp associated with the immediately preceding attempt to schedule the pod 220. If the amount of time that has elapsed is greater than the threshold amount of time, the scheduler service 217 may not make a subsequent scheduling attempt based on the set of scheduling data 222 and may instead attempt to schedule the pod 220 based on the default security policy (e.g., using the default predicates) and the resource requirements of the pod 220. This is because expiration of the threshold amount of time may indicate that the amount of available resources on one or more nodes 131 has changed such that previously unsuitable nodes may have become more suitable (e.g., have had additional resources freed up etc.). At block 510, if the amount of time that has elapsed since the preceding attempt is less than or equal to the threshold amount of time, then at block 515 the scheduler service 217 may exclude a node 131 that was the subject of the preceding attempt to schedule the pod 220 from scheduling consideration. At block 520, the scheduler service 217 may attempt to schedule the pod 220 based on the default security policy (e.g., using the default predicates) and the resource requirements of the pod 220 but may exclude the node 131 that was the subject of the preceding attempt to schedule the pod 220 from consideration.

Upon determining the node 131 on which it will attempt to schedule the pod 220, the scheduler service 217 may update the scheduling data 222 with the corresponding timestamp and node identity of the determined node 131 and attempt to schedule the pod 220 on the determined node 131. The above described process may be performed iteratively until a predetermined event occurs, such a successful attempt to schedule the pod 220 on one of the nodes 131. A successful attempt to assign the pod 220 to the determined node 131 may correspond to the determined node 131 successfully binding the pod 220 to the determined node 131.

Figure 6:
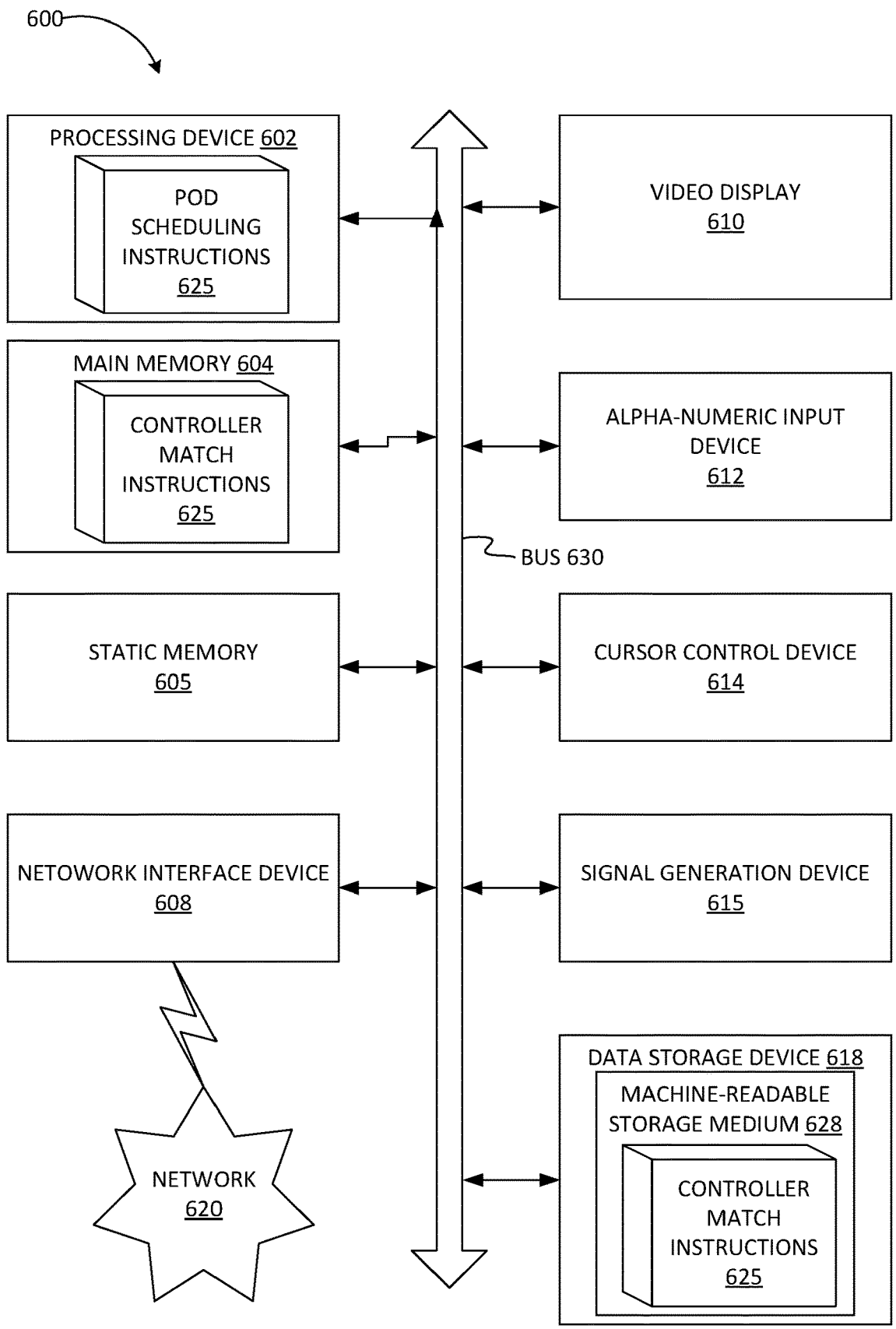
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for intelligently scheduling pods.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute pod scheduling instructions 625, for performing the operations and steps discussed herein.

The data storage device 618 may include a machine-readable storage medium 628, on which is stored one or more sets of pod scheduling instructions 625 (e.g., software) embodying any one or more of the methodologies of functions described herein. The pod scheduling instructions 625 may also reside, completely or at least partially, within the main memory 604 or within the processing device 602 during execution thereof by the computer system 600; the main memory 604 and the processing device 602 also constituting machine-readable storage media. The pod scheduling instructions 625 may further be transmitted or received over a network 620 via the network interface device 608.

The machine-readable storage medium 628 may also be used to store instructions to perform a method for determining if a controller that can service a CRD exists, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware--for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   scheduling a pod on a first node of a plurality of nodes;
   updating scheduling data in a data structure of the pod with a node identifier (ID) of the first node and a time stamp indicating a time at which the pod was scheduled on the first node;
   in response to receiving an indication that the pod has been evicted from the first node, removing the first node from the plurality of nodes to generate an updated plurality of nodes; and
   determining, by a processing device, a second node of the updated plurality of nodes on which to schedule the pod based at least in part on the scheduling data of the pod.

2. The method of claim 1, further comprising:
   scheduling the pod on the second node of the updated plurality of nodes; and
   updating the scheduling data of the pod with a node ID of the second node and a second time stamp indicating a time at which the pod was scheduled on the second node.

3. The method of claim 2, further comprising:
   in response to receiving an indication that the pod has been evicted from the second node, iteratively, until the pod is successfully scheduled on one of the plurality of nodes:
   determining a subsequent node of the plurality of nodes on which to schedule the pod based at least in part on the scheduling data of the pod;
   updating the scheduling data of the pod with a node ID of the subsequent node and a subsequent time stamp indicating a time at which the pod was scheduled on the subsequent node; and
   scheduling the pod on the subsequent node of the plurality of nodes.

4. The method of claim 1, wherein determining the second node of the updated plurality of nodes comprises:
   determining whether a threshold amount of time has passed after the scheduling of the pod on the first node; and
   in response to determining that the threshold amount of time has not passed after the scheduling of the pod on the first node:
   determining from the updated plurality of nodes, the second node on which to schedule the pod based at least in part on a security policy associated with the pod and a resource utilization of the pod.

5. The method of claim 4, wherein determining the second node further comprises:
   in response to determining that the threshold amount of time has passed after the scheduling of the pod on the first node, determining from the plurality of nodes, the second node on which to schedule the pod based at least in part on the security policy associated with the pod and the resource utilization of the pod.

6. The method of claim 3, wherein successfully scheduling the pod on a particular node of the plurality of nodes comprises binding the pod to the particular node.

7. The method of claim 1, wherein the scheduling data of the pod is stored in the data structure within the pod.

8. A system comprising:
   a memory; and
   a processing device operatively coupled to the memory, the processing device to:
   schedule a pod on a first node of a plurality of nodes;
   update scheduling data in a data structure of the pod with a node identifier (ID) of the first node and a time stamp indicating a time at which the pod was scheduled on the first node;
   in response to receiving an indication that the pod has been evicted from the first node, remove the first node from the plurality of nodes to generate an updated plurality of nodes; and
   determine a second node of the updated plurality of nodes on which to schedule the pod based at least in part on the scheduling data of the pod.

9. The system of claim 8, wherein the processing device is further to:
   schedule the pod on the second node of the updated plurality of nodes; and
   update the scheduling data of the pod with a node ID of the second node and a second time stamp indicating a time at which the pod was scheduled on the second node.

10. The system of claim 9, wherein the processing device is further to:
    in response to receiving an indication that the pod has been evicted from the second node, iteratively, until the pod is successfully scheduled on one of the plurality of nodes:
    determine a subsequent node of the plurality of nodes on which to schedule the pod based at least in part on the scheduling data of the pod;
    update the scheduling data of the pod with a node ID of the subsequent node and a subsequent time stamp indicating a time at which the pod was scheduled on the subsequent node; and
    schedule the pod on the subsequent node of the plurality of nodes.

11. The system of claim 8, wherein to determine the second node, the processing device is to:
    determine whether a threshold amount of time has passed after the scheduling of the pod on the first node; and
    in response to determining that the threshold amount of time has not passed after the scheduling of the pod on the first node:
    determine from the updated plurality of nodes, the second node on which to schedule the pod based at least in part on a security policy associated with the pod and a resource utilization of the pod.

12. The system of claim 11, wherein to determine the second node, the processing device is further to:
    in response to determining that the threshold amount of time has passed after the scheduling of the pod on the first node, determine from the plurality of nodes, the second node on which to schedule the pod based at least in part on the security policy associated with the pod and the resource utilization of the pod.

13. The system of claim 10, wherein successfully scheduling the pod on a particular node of the plurality of nodes comprises binding the pod to the particular node.

14. The system of claim 8, wherein the scheduling data of the pod is stored in the data structure within the pod.

15. A non-transitory computer-readable medium having instructions stored thereon which, when executed by a processing device cause the processing device to:
   schedule a pod on a first node of a plurality of nodes;
   update scheduling data in a data structure of the pod with a node identifier (ID) of the first node and a time stamp indicating a time at which the pod was scheduled on the first node;
   in response to receiving an indication that the pod has been evicted from the first node, remove the first node from the plurality of nodes to generate an updated plurality of nodes; and
   determine, by the processing device, a second node of the updated plurality of nodes on which to schedule the pod based at least in part on the scheduling data of the pod.

16. The non-transitory computer-readable medium of claim 15, wherein the processing device is further to:
   schedule the pod on the second node of the updated plurality of nodes; and
   update the scheduling data of the pod with a node ID of the second node and a second time stamp indicating a time at which the pod was scheduled on the second node.

17. The non-transitory computer-readable medium of claim 16, wherein the processing device is further to:
   in response to receiving an indication that the pod has been evicted from the second node, iteratively, until the pod is successfully scheduled on one of the plurality of nodes:
      determine a subsequent node of the plurality of nodes on which to schedule the pod based at least in part on the scheduling data of the pod;
      update the scheduling data of the pod with a node ID of the subsequent node and a subsequent time stamp indicating a time at which the pod was scheduled on the subsequent node; and
      schedule the pod on the subsequent node of the plurality of nodes.

18. The non-transitory computer-readable medium of claim 15, wherein to determine the second node, the processing device is to:
   determine whether a threshold amount of time has passed after the scheduling of the pod on the first node; and
   in response to determining that the threshold amount of time has not passed after the scheduling of the pod on the first node:
      determine from the updated plurality of nodes, the second node on which to schedule the pod based at least in part on a security policy associated with the pod and a resource utilization of the pod.

19. The non-transitory computer-readable medium of claim 18, wherein to determine the second node, the processing device is further to:
   in response to determining that the threshold amount of time has passed after the scheduling of the pod on the first node, determine from the plurality of nodes, the second node on which to schedule the pod based at least in part on the security policy associated with the pod and the resource utilization of the pod.

20. The non-transitory computer-readable medium of claim 17, wherein successfully scheduling the pod on a particular node of the plurality of nodes comprises binding the pod to the particular node.

* * * * *